(12) United States Patent
Tieman

(10) Patent No.: US 6,217,338 B1
(45) Date of Patent: Apr. 17, 2001

(54) BRAILLE CELL AND DISPLAY COMPRISING A PLURALITY OF BRAILLE CELLS, AS WELL AS A METHOD FOR CONTROLLING A PLURALITY OF PINS OF A BRAILLE CELL

(75) Inventor: Frans Jan Tieman, Vosselaar (BE)

(73) Assignee: Turn-out N.V., Vosselaar (BE)

( * ) Notice: Subject to any disclaimer, the term of this patent is extended or adjusted under 35 U.S.C. 154(b) by 0 days.

(21) Appl. No.: 09/355,062

(22) PCT Filed: Jan. 23, 1998

(86) PCT No.: PCT/NL98/00046

§ 371 Date: Jul. 22, 1999

§ 102(e) Date: Jul. 22, 1999

(87) PCT Pub. No.: WO98/36401

PCT Pub. Date: Aug. 20, 1998

(30) Foreign Application Priority Data

Jan. 27, 1997 (NL) .................................................. 1005093

(51) Int. Cl.⁷ .................................................. G09B 21/00
(52) U.S. Cl. .............................. 434/114; 434/113; 434/112
(58) Field of Search ...................................... 434/113, 114

(56) References Cited

U.S. PATENT DOCUMENTS

| | | | |
|---|---|---|---|
| 4,473,356 | * 9/1984 | Fernando et al. | 434/114 |
| 4,633,121 | * 12/1986 | Ogawa et al. | 434/114 |
| 5,842,867 | * 12/1998 | Hong et al. | 434/114 |

* cited by examiner

Primary Examiner—Jacob K. Ackun, Jr.
Assistant Examiner—Urszula M. Cegielnik
(74) Attorney, Agent, or Firm—Thomas, Kayden, Horstemeyer & Risley

(57) ABSTRACT

A Braille cell having a pressure-exerting member in the form of a bar or leaf spring, of which one end can be displaced with the aid of a first displacement mechanism in a direction that is perpendicular to a longitudinal direction. One end of the pressure-exerting member is configured for placement in either a first or second position. In the first position, the pressure-exerting member does not place touch pins in a high position, while in the second position, the pressure-exerting member does place the touch pins in a high position. A second displacement mechanism is configured to displace the end of the pressure-exerting member, after the end has been disposed in one of the first or second positions, in the longitudinal direction, in such a manner that a touch pin is placed or is not placed in the high position. This allows a touch pin to be fixed in the correct position with respect to the touch surface of the touch board in a very simple manner.

10 Claims, 6 Drawing Sheets

BRAILLE CELL AND DISPLAY COMPRISING A PLURALITY OF BRAILLE CELLS, AS WELL AS A METHOD FOR CONTROLLING A PLURALITY OF PINS OF A BRAILLE CELL

The invention relates to a braille cell comprising a frame, a touch board and a plurality of touch pins, each touch pin being enclosed in a cavity in the touch board in such a manner that it can be displaced from a low position, in which the touch pin does not project above the touch surface of the touch board, to a high position, in which the touch pin projects above the touch board by a specific, desired length, and in which frame there is arranged a displacement member, which displacement member can be moved into a desired position under the influence of displacement means, with the result that, depending on the position of the displacement member, a touch pin which is enclosed in a cavity in a touch board may or may not be moved into the high position, in which it projects above the surface of the touch board, as well as to a method for controlling a plurality of touch pins of a braille cell.

Braille cells of the type described above are known, inter alia, from American U.S. Pat. No. 4,283,178. A braille cell of this kind can be used to make a braille symbol which can be detected by the visually handicapped using their fingers. By placing a plurality of braille cells in succession, it is possible to form a number of words. By using braille cells of this kind in combination with, for example, a computer terminal, it is possible for the visually handicapped to perceive the information from the computer.

However, the known braille cells have a number of drawbacks. The braille cells, which are provided with many piezoelectric bending elements, are expensive to produce. Moreover, it is important for the braille symbols to be of a fixed size, so that the correct meaning can be worked out by the visually handicapped. Also, the structure and shape of the braille cells known to date mean that it is only possible to form a single reading line, so that often it is only possible to display parts of sentences, and not complete passages of text. Moreover, braille cells of this kind have to be cleaned regularly, since dirt from the fingers penetrates into and around the pins in the small holes in which the pins move up and down. Since there are numerous electronic components in the vicinity of this pin, cleaning the braille cells is a very labour-intensive operation. Moreover, the lengths of the various touch pins in a braille cell are different, with the result that a plurality of different components are required when assembling the braille cells, resulting in extra costs.

The object of the invention is to provide a braille cell which can be produced at low cost and is formed in such a way that a large number of braille characters can be placed next to and above one another, so that a braille reading board composed of a plurality of lines can be assembled, and preferably a display.

This object is achieved with a braille cell of the type described in the preamble by the fact that the pressure-exerting member is a member, for example in the form of a bar or leaf spring, of which one end can be displaced, with the aid of first displacement means, in a direction perpendicular to the longitudinal direction, it then being possible to place the one end of the bar-like member in a first or a second position, in which case in one of the two positions the pressure-exerting member cannot place the specific touch pin in the high position and in the other position the pressure-exerting member can place the specific touch pin in the high position, and it being possible for second displacement means to displace the end of the pressure-exerting member, after the end has adopted one of the two possible positions, in the longitudinal direction, in such a manner that a touch pin is placed or is not placed in the high position. This measure allows a touch pin to be fixed in the correct position with respect to the touch surface of the touch board in a very simple manner.

In a preferred embodiment of the braille cell according to the invention, the first displacement means comprise a plurality of first displacement members, it being possible for each first displacement member to displace the end of a plurality of pressure-exerting members, and a retention member is arranged in the frame close to each touch pin, which retention member serves to hold the end of the pressure-exerting member, after the latter has been displaced over a specific distance in the longitudinal direction with the aid of the second displacement means, in the desired first or second position. This measure makes it possible to produce a very compact braille cell.

In one embodiment of the Braille cell described above, each first displacement member may be configured to be displaceable by either piezoelectricity or magnetic forces. Also, the second displacement means may be a camshaft.

In another possible preferred embodiment according to the invention, a plurality of braille cells are combined to form a display in such a manner that the display comprises a touch board, in which a plurality of groups of touch pins are arranged, it being possible for each group of touch pins to form a braille symbol.

This measure allows all the pressure-exerting members of the various braille symbols to be placed in the desired position very quickly and then allows all the braille symbols to be formed simultaneously and made tangible to a visually handicapped person.

Preferably, the method for controlling a plurality of touch pins of a braille cell is such that the end of a first pressure-exerting member is placed in a desired first position or a second position with the aid of first displacement means, so that the end of a first pressure-exerting member can interact with a member, preferably a wedge-shaped member, and such that the first pressure-exerting member is then displaced in the longitudinal direction, with the aid of second displacement means, over a distance which is such that the end is placed on one side or the other of the wedge-shaped member, depending on the first or the second position, after which the first pressure-exerting member is displaced further in the longitudinal direction, so that the end of the first pressure-exerting member, depending on the location with respect to the wedge, is able or is unable to displace a touch pin and retain it in a desired position. A device which operates in accordance with the method according to the invention has the advantage that the first displacement means can control a plurality of pressure-exerting members; as a result, it is also possible to produce a braille cell, as well as a display which is composed of a plurality of braille cells next to one another, more cheaply and in a more compact form.

Adding the following method to this method, namely in that after a first pressure-exerting member has been placed in a desired position with the aid of the first displacement means, the same first displacement means are then used to place a second pressure-exerting member in a desired first position or a second position, so that the end of the second pressure-exerting member can interact with a second member, preferably a wedge-shaped member, in that the second pressure-exerting member is then displaced in the longitudinal direction, with the aid of second displacement means, over a distance which is such that the end of the second pressure-exerting member is placed on one side or the other of the second wedge-shaped member, depending on the first or the second position, after which the second pressure-exerting member is displaced further in the longitudinal direction, so that the end of the pressure-exerting member, depending on the location with respect to the wedge, is able or is unable to displace a touch pin which is not the touch pin displaced by the first pressure-exerting member and can retain this other touch pin in a desired position, allows such a device according to the invention to be made even more inexpensive. The compact design means that it is possible in a simple manner to construct a braille reading board comprising a plurality of lines.

The invention will be explained in more detail with reference to the drawing, in which.

Figure 1:
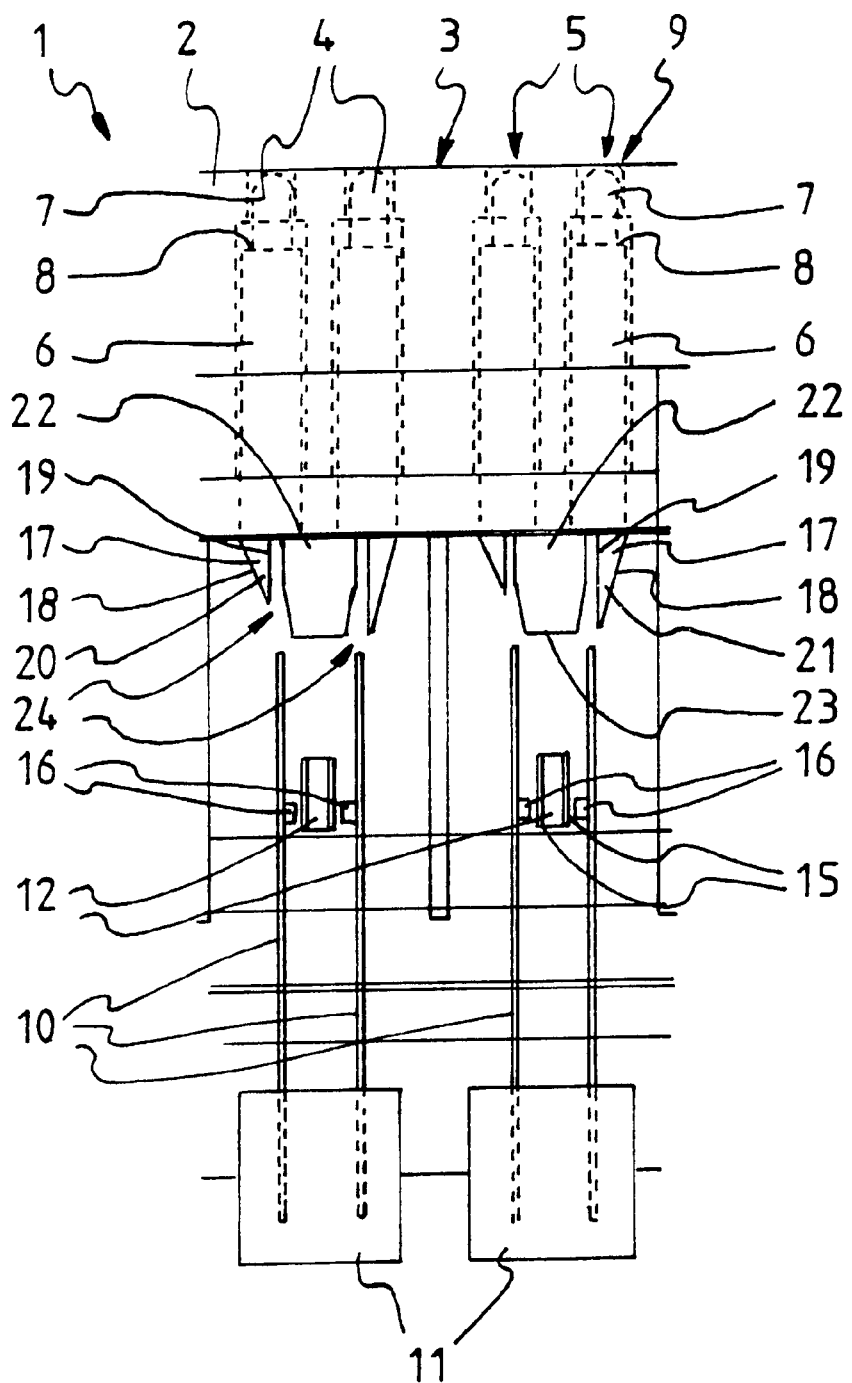
FIG. 1 shows a diagrammatic illustration, in side view, of two braille cells according to the invention.
Figure 2:
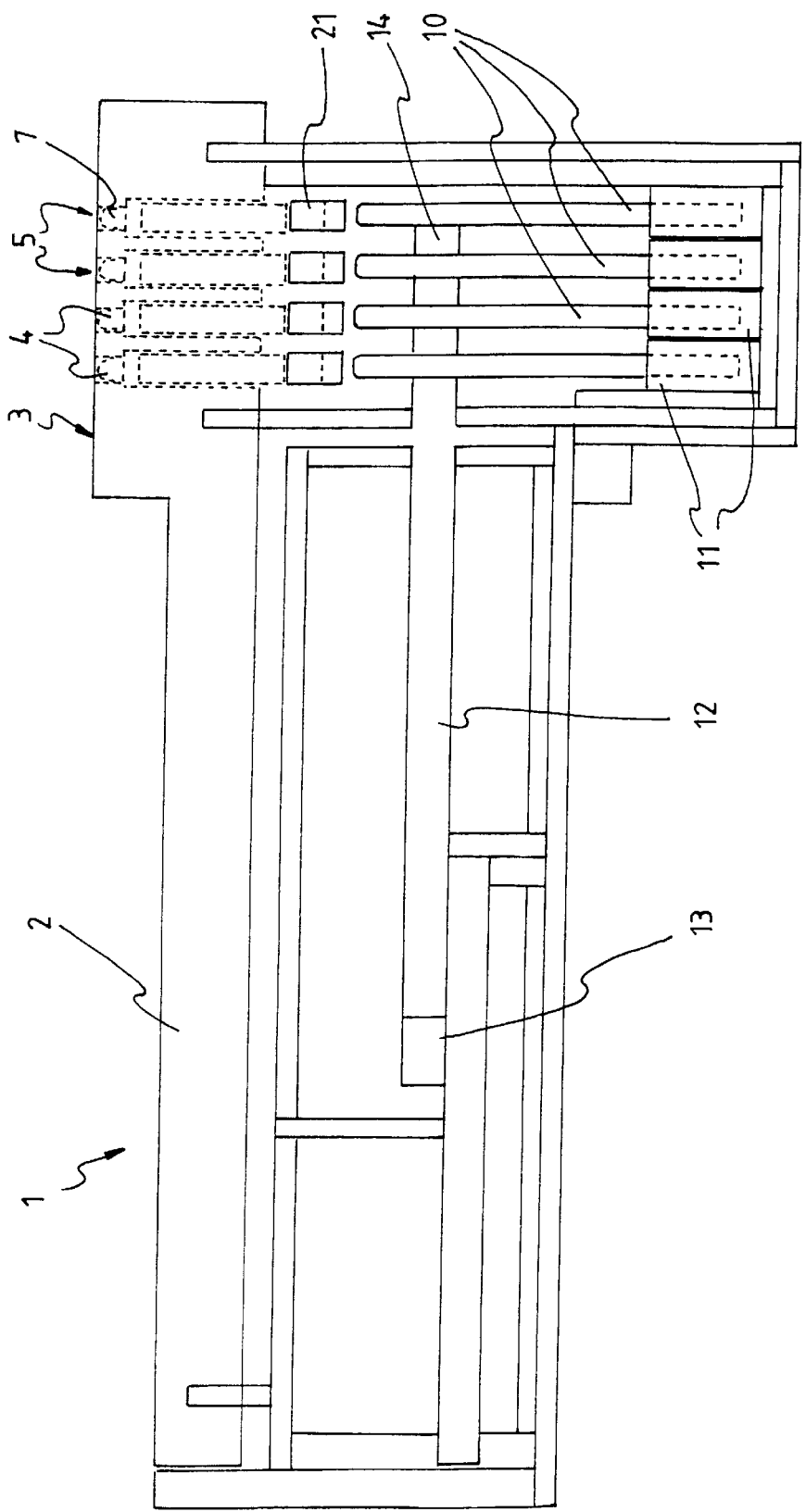
FIG. 2 shows a longitudinal view of a braille cell in accordance with FIG. 1.
Figure 3:
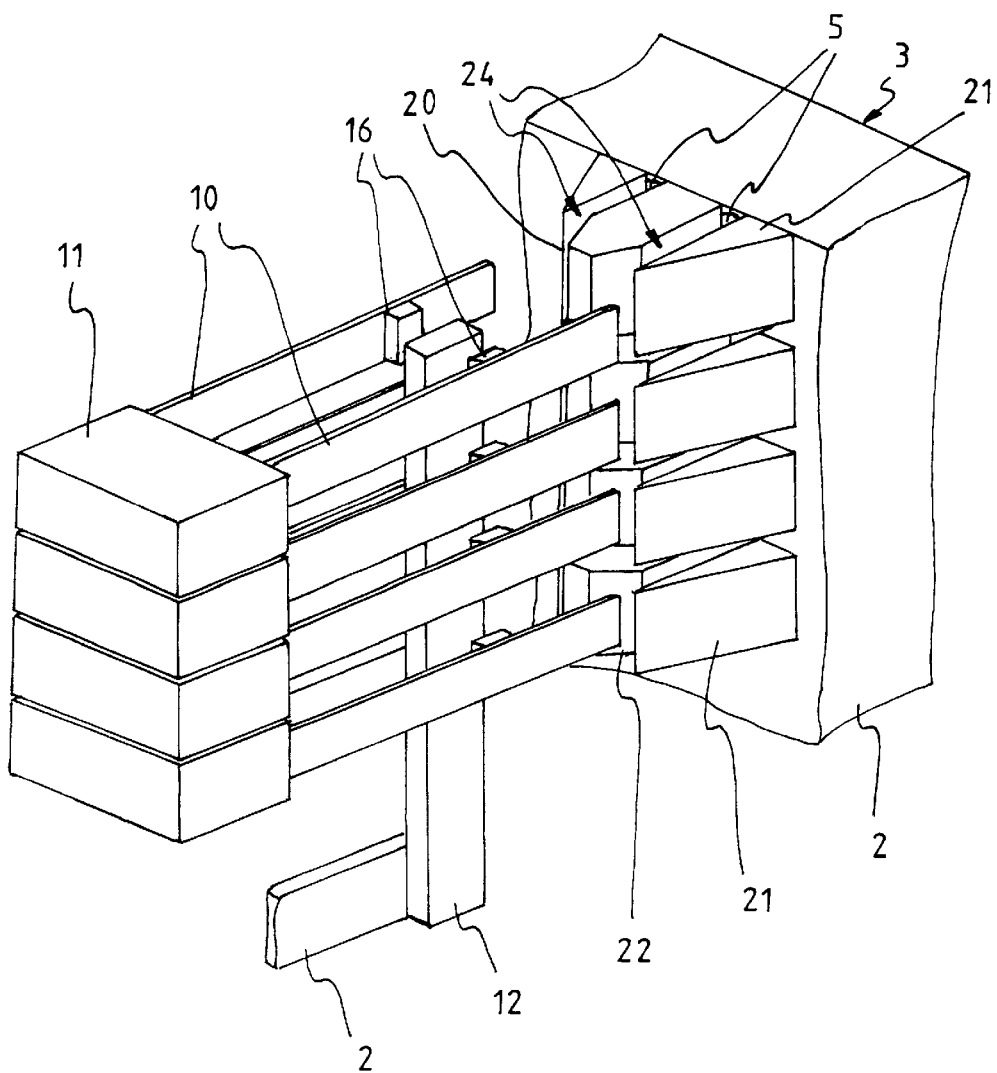
FIG. 3 shows a perspective view of a braille cell in accordance with FIGS. 1 and 2.
Figure 5:
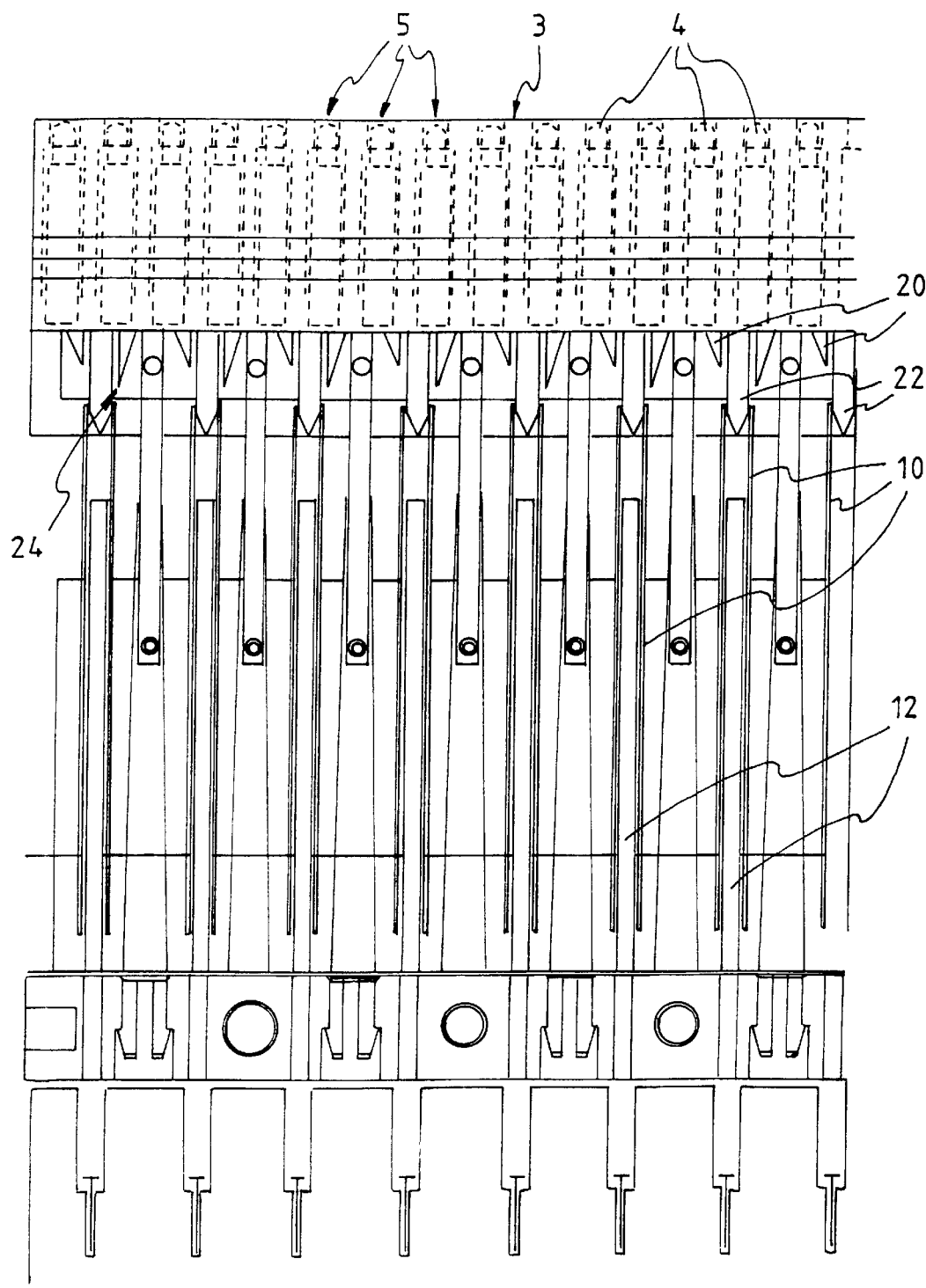
Figure 6:
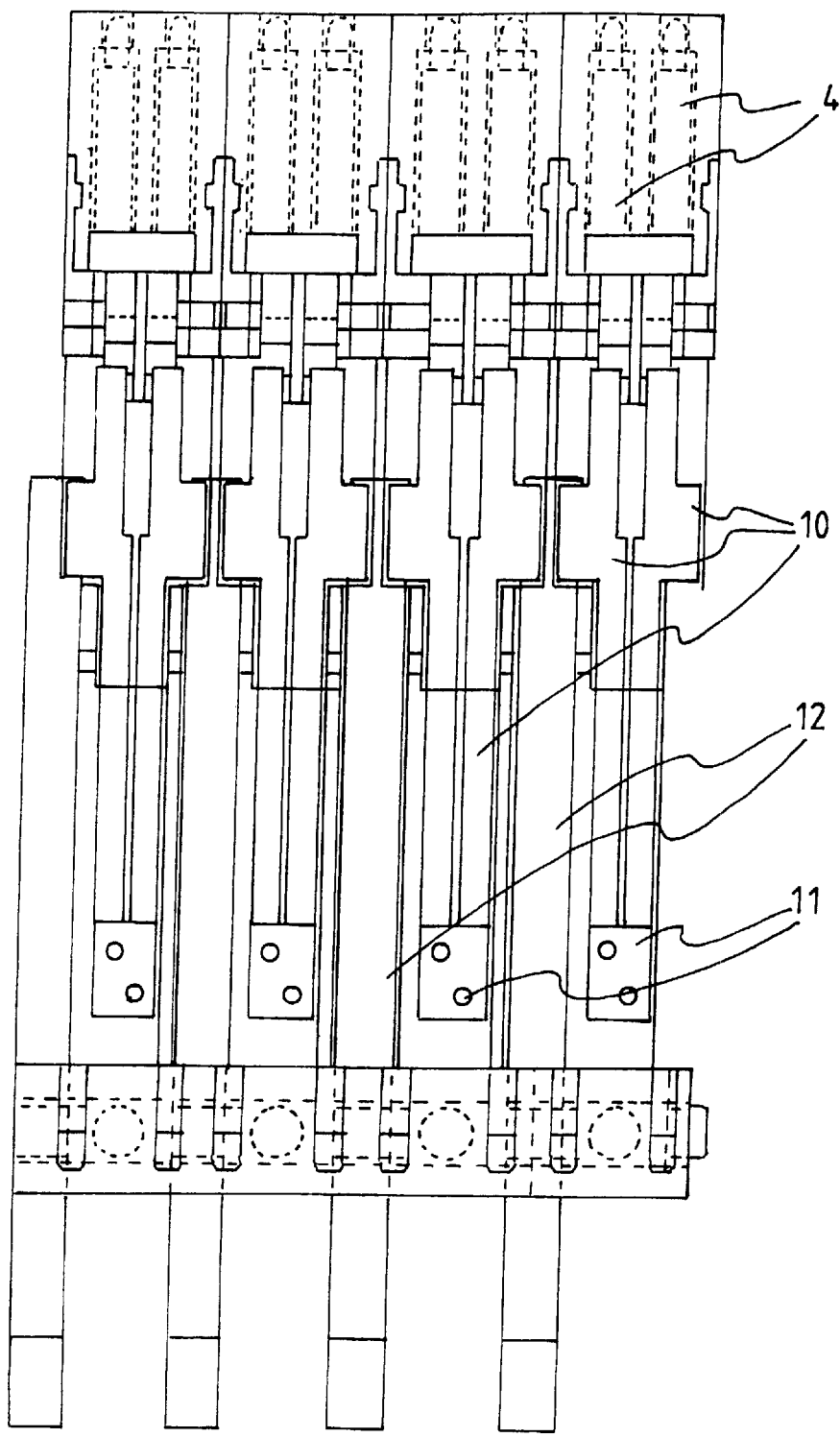

FIGS. 4A–D show successive steps in making a braille symbol readable in a braille cell in accordance with FIG. 1;

FIG. 5 shows a diagrammatic side view of another possible braille cell according to the invention;

FIG. 6 shows a longitudinal view of a braille cell in accordance with FIG. 5.

FIG. 1 diagrammatically shows two braille cells 1. Each braille cell 1 comprises a frame 2 with a touch board 3. The braille cell 1 comprises eight touch pins 4, which can be displaced in the longitudinal direction, are accommodated in openings or cavities 5 partially in the frame 2 and partially in the touch board 3, and can be slid up and down between a retracted, low position, in which the pins 4 do not project above the top surface of the touch board 3, and an extended, or high, position, in which the pins 4 project above the top surface of the touch board 3, in such a manner that a user can feel the pin 4 in question when it has been placed in the high position. The small pins 4 are arranged in two rows of four pins 4 per braille cell 1. In this way, six of the eight pins can be used to form braille symbols. The remaining two pins 4 can be used for extra information, for example upper-case letters, an accent, figures. The pins 4 each comprise a cylindrical body 6 on which there is arranged a rounded, narrow end 7, the diameter of the thin end 7 being less than the diameter of the cylindrical body 6, so that a shoulder 8 is produced. The openings 5 are correspondingly designed with a cylindrical narrowing 9 in the touch board 3. When a pin 4 is pushed upwards, the shoulder 8 strikes the underside of the cylindrical narrowing 9, so that the pin 4 cannot slide out of the frame 2. Due to the fact that the end 7 is longer than the cylindrical narrowing 9, the pin, if placed in the high position, projects above the top surface of the touch board 3, so that it can be felt by the touch of a user.

A pressure-exerting member or leaf spring 10 is arranged in line with each of the pins 4. That end of each pair of leaf springs 10 which is remote from the pins 4 is attached in the region of an end in a slidable part, or sliding part 11. The sliding part 11 can be displaced in the longitudinal direction of the leaf springs 10. A pair of leaf springs 10 is attached in each sliding part. Both the pins 4 and the leaf springs 10 are arranged in pairs. A displacement member or bending element 12 is placed between the two leaf springs 10 of each pair of leaf springs, which bending element can bend, by means of a control signal, in a plane which is essentially transverse to the longitudinal direction of the leaf springs 10.

This bending element 12 is a small elongate bar which is fixed at one end 13 with respect to the frame 2, while the other, free end 14 can bend backwards and forwards and is situated between four pairs of leaf springs which are arranged around the bending element in such a way that four leaf springs 10 are disposed on either side of the end of the bending element 12, which leaf springs can bend in a plane which is essentially perpendicular to the bending element 12. In this exemplary embodiment, the bending element is designed as a piezoelectric bending element, which is provided on both sides with a layer of piezoelectric material 15, to which an electric power supply is connected. If a potential is applied to one of the layers 15, the piezoelectric material contracts, so that as a result the bending element 12 bends. When the potential returns to the original level, the relevant layer 15 is rest red to its original shape and the bending element 12 will be straight again. Each leaf spring 10 is provided with a small projection 16.which faces towards the bending element. The dimensions and position of the projection 16 are such that when the leaf spring 10 is situated in the at-rest position the projection lies next to the bending element 12, while when the leaf spring 10 is extended the projection 16 is no longer situated next to the bending element 12.

Between each leaf spring 10 and each pin 4, there is a wedge-shaped body or wedge 17, with a sloping side 18 and a straight side 19 which runs essentially parallel to the leaf springs 10. For each pair of leaf springs 10, a short wedge 20 is laced opposite the end of one leaf spring 10, while a long wedge 21 is placed opposite the end of the other leaf spring 10, in such a manner that the straight side 19 of the long wedge 21 and the straight side 19 of the short wedge 20 face one another. An intermediate piece 22 is placed between the short wedge 20 and the long wedge 21. At the end 23 which faces towards the leaf springs, this intermediate piece 22 is bevelled slightly. A gap 24, which is slightly wider than the thickness of the leaf springs 10, is left clear between the intermediate piece 22 and the short wedge 20 and long wedge 21. These gaps 24 each lie in line with the associated leaf spring 10. As a result, each leaf spring 10 can be pressed or slid against the underside of the corresponding pin 4, via the gap 24.

Figure 4D:
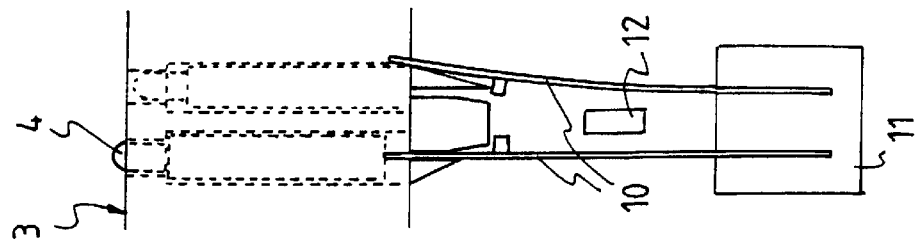
Figure 4C:
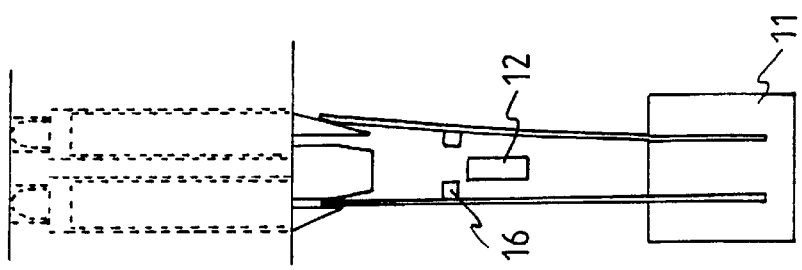
Figure 4B:
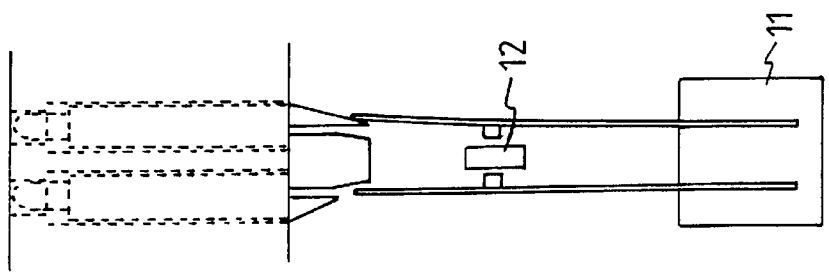
Figure 4A:
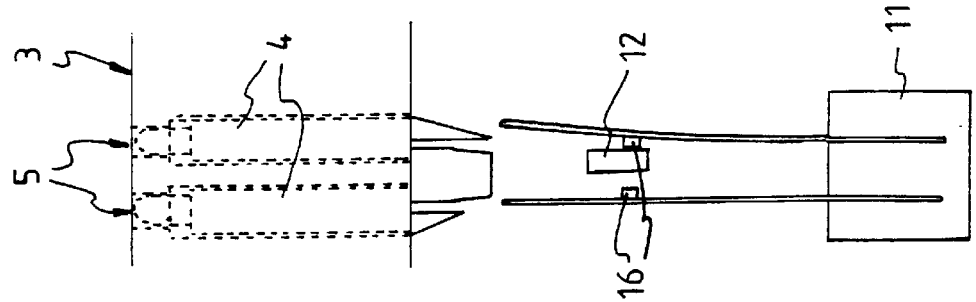

The braille cell 1 works as follows. In the at-rest position, on, all the pins 4 are retracted, so that they do not project above the top surface 3 and thus cannot be detected by touch. The leaf springs 10 are likewise in the at-rest position in which the projections 16 lie next to the bending element 12. If a specific symbol, for example a specific letter, is to be displayed in braille with the aid of the braille cell 1, a number of control signals are generated for activating the sliding parts 11 and the bending elements 12. The pairs of adjacent leaf springs 10 are activated one by one. In the pair of leaf springs 10 which is activated first, initially the leaf spring 10 whose free end is positioned opposite the long wedge 21 is activated. If it is necessary to display a braille symbol where the associated pin 4 has to remain withdrawn beneath the surface of the touch board 3, a potential is applied to that piezoelectric layer 15 of the bending element 12 which faces towards the leaf spring 10 in question, this potential being of such a magnitude that the bending element bends towards the leaf spring 10 and, with the aid of the projection 16, bends the leaf spring 10 to the side. This situation is illustrated in FIG. 4A. However, it it is necessary to display a braille symbol where the associated pin 4 has to be extended above the top surface of the touch board 3, the bending element 12 is not bent, so that the leaf spring 10 likewise does not bend. The sliding part 11 is then slid in the direction of the wedge 21 long until it reaches a first position in which the end of the leaf spring 10 has moved past the end of the wedge 21 long but the end of the other leaf spring 10 has not yet moved past the end of the short wedge 20. If the leaf spring 10 has been bent by the bending element 12, the leaf spring 10 can no longer bend back when the bending member is returned to the unbent position, since the end of the spring 10 is resting against the sloping face of the wedge 21 long. The leaf spring 10 thus remains in the selected position even when the bending element 12 bends back again. This situation is illustrated in FIG. 4B. The other leaf spring 10 is now placed in the desired position. If the associated pin 4 needs to be extended in order to be able to display the desired braille symbol, the leaf spring 10 has to continue to move straight on in the direction of the gap 24. However, if the pin 4 is not to be extended, the piezoelectric bending element 12 is bent so that it pushes the leaf spring 10 to the side. After the leaf spring 10 has been placed in the selected position, the sliding part 11 is moved further upwards until the end of the leaf spring 10 moves past the end of the short wedge 20. The selected position of this leaf spring 10 is now fixed by the short wedge 20 This situation is illustrated in FIG. 4C. The remaining pairs of leaf springs 10 are now placed in a selected position in a corresponding manner. When all the leaf springs of the braille cell have been placed in a selected position, the sliding parts 11 are simultaneously slid further in the direction of the top surface 3, the leaf springs 10 which have not been bent out of the straight position being pushed through the associated gap 24 and against the underside of the corresponding pin 4 which is to be pushed upwards, and then they push this pin 4 upwards until the shoulder 8 of the pin strikes the underside of the narrowing wing 9 of the opening S. The pin 4 can now be detected by touch by a user, the pins 4 of a braille cell which has been moved upwards forming a braille symbol. This situation is illustrated in FIG. 4D. By moving the sliding parts back down again, the pins 4 can be moved back to the low position, with the result that the information displayed by the braille cell 1 is erased.

FIGS. 5 and 6 show the second possible embodiment in which in each pair of leaf springs 10 one leaf spring 10 has to be bent around a wedge in order to be able to move the corresponding pin 4 upwards, while the other leaf spring 10 has to be moved upwards via the gap 24 in order to b able to move the corresponding pin 4 upwards.

What is claimed is:

1. A Braille cell comprising;
   frame, a touch board and a plurality of touch pins, each touch pin being enclosed in a cavity in the touch board such that each touch pin is displaceable in a longitudinal direction from a low position, in which the touch pin does not project above a touch surface of the touch board, to a high position, in which the touch pin projects above the touch surface of the touch board by a predetermined length, the frame having arranged therein a pressure-exerting member, the pressure-exerting member being moveable to a predetermined position such that a specific touch pin is movable into the high position, said pressure-exerting member having a first end displaceable, by a first displacement mechanism, in a direction perpendicular to the longitudinal direction such that the first end of the pressure-exerting member is moveable between a first position and a second position, in the first position the pressure-exerting member being configured to prevent placement of the specific touch pin in the high position, and in the second position the pressure-exerting member being configured to enable placement of the specific touch pin in the high position, and wherein a second displacement mechanism is configured to displace the first end of the pressure-exerting member, after the first end has adopted the second position, in the longitudinal direction, such that the specific touch pin is placed in the high position.

2. The Braille cell of claim 1, wherein the first displacement mechanism comprises a plurality of first displacement members, each of said first displacement members being configured to displace the respective first ends of a plurality of said pressure-exerting members, and wherein a retention member is arranged in the frame proximate to each touch pin, each said retention member being configured to retain the first end of one of the pressure-exerting members in said first position after the first end is displaced in the longitudinal direction by the second displacement mechanism.

3. The Braille cell of claim 2, wherein the retention member is a wedge-shaped member tapering from a first end to a second end along an axis parallel to the longitudinal direction.

4. The Braille cell of claim 3, wherein a pair of said pressure-exerting members have a pair of said retention members associated therewith, said retention members being wedge-shaped and formed of different lengths.

5. The Braille cell of claim 1, wherein each first displacement member has a portion thereof configured to be displaceable by one of the group selected from: piezoelectricity and magnetic forces.

6. The Braille cell of claim 1, wherein each pressure-exerting member has a projection configured to interact with one of said first displacement members.

7. The Braille cell of claim 1, wherein the second displacement member comprises a camshaft.

8. A display comprising:
   a touch board having a plurality of groups of touch pins arranged therein, each group of touch pins being configured to form a Braille symbol, each touch pin being displaceable in a longitudinal direction from a low position, in which the touch pin does not project above a touch surface of the touch board, to a high position, in which the touch pin projects above the touch surface of the touch board; and
   a pressure-exerting member moveable to a predetermined position such that a specific touch pin is movable into the high position, said pressure-exerting member having a first end displaceable in a direction perpendicular to the longitudinal direction such that the first end of the pressure-exerting member is moveable between a first position and a second position, in the first position the pressure-exerting member being configured to prevent placement of the specific touch pin in the high position, and in the second position the pressure-exerting member being configured to enable placement of the specific touch pin in the high position.

9. The display of claim 8, further comprising means for displacing said pressure-exerting member in a direction perpendicular to the longitudinal direction.

10. The display of claim 8, further comprising means for displacing the first end of the pressure-exerting member in the longitudinal direction.

* * * * *